United States Patent
Hörmann

(10) Patent No.: US 9,632,967 B2
(45) Date of Patent: Apr. 25, 2017

(54) CONTROL METHOD FOR A DOOR DRIVE AND DOOR DRIVE

(75) Inventor: Michael Hörmann, Halle/Westfahlen (DE)

(73) Assignee: Marantec-Antriebs—und Steuerungstechnik GmbH & Co. KG (DE)

( * ) Notice: Subject to any disclaimer, the term of this patent is extended or adjusted under 35 U.S.C. 154(b) by 321 days.

(21) Appl. No.: 13/528,545

(22) Filed: Jun. 20, 2012

(65) Prior Publication Data

US 2013/0159573 A1 Jun. 20, 2013

(30) Foreign Application Priority Data

Jul. 20, 2011 (DE) .................. 10 2011 108 102

(51) Int. Cl.
| | | |
|---|---|---|
| G06F 13/42 | (2006.01) | |
| H04L 12/40 | (2006.01) | |
| H04L 12/403 | (2006.01) | |
| H04L 12/823 | (2013.01) | |

(52) U.S. Cl.
CPC ............ *G06F 13/42* (2013.01); *H04L 12/403* (2013.01); *H04L 12/40156* (2013.01); *H04L 47/32* (2013.01)

(58) Field of Classification Search
CPC ............. G06F 13/42; H04L 12/401156; H04L 12/403; H04L 47/32
USPC .................................... 700/79; 710/110, 105
See application file for complete search history.

(56) References Cited

U.S. PATENT DOCUMENTS

| | | | |
|---|---|---|---|
| 6,014,307 A * | 1/2000 | Crimmins ..................... 361/170 |
| 6,353,615 B1 * | 3/2002 | Bohne ........................... 370/442 |
| 7,103,422 B2 * | 9/2006 | Takeuchi et al. ............... 700/21 |
| 7,912,563 B2 * | 3/2011 | Oosako .......................... 700/79 |
| 8,134,448 B2 * | 3/2012 | Oster et al. .................... 340/3.1 |
| 8,321,613 B2 * | 11/2012 | Korrek ........................... 710/110 |
| 2002/0040252 A1 * | 4/2002 | Behr et al. ..................... 700/79 |
| 2007/0018600 A1 * | 1/2007 | Marchetto et al. ........... 318/466 |
| 2007/0076655 A1 * | 4/2007 | Manjeshwar et al. ........ 370/329 |
| 2009/0196306 A1 * | 8/2009 | King et al. .................... 370/462 |
| 2009/0228116 A1 * | 9/2009 | Oosako ............................ 700/7 |

(Continued)

FOREIGN PATENT DOCUMENTS

| | | |
|---|---|---|
| DE | 196 20 137 | 11/1997 |
| DE | 10 2006 051 222 | 3/2008 |

(Continued)

OTHER PUBLICATIONS

German Patent Office search report dated Jul. 31, 2012.
German Patent Office Search Report dated Jul. 19, 2012 in application 12002453.4-2416.

*Primary Examiner* — Nimesh G Patel
(74) *Attorney, Agent, or Firm* — Martin & Ferraro, LLP

(57) ABSTRACT

The invention relates to a method of controlling a door drive having a plurality of components which are communicatively connected to one another via a digital bus system, wherein at least one component is a safety component which reports the occurrence of a safety-relevant event over the data bus, and wherein the bus protocol reserves a cyclic safety phase for reporting a safety-relevant event and at least one component recognizes an undefined data transmission during the safety phase as a report of a safety-relevant event.

5 Claims, 1 Drawing Sheet

(56) References Cited

U.S. PATENT DOCUMENTS

Figure 1:
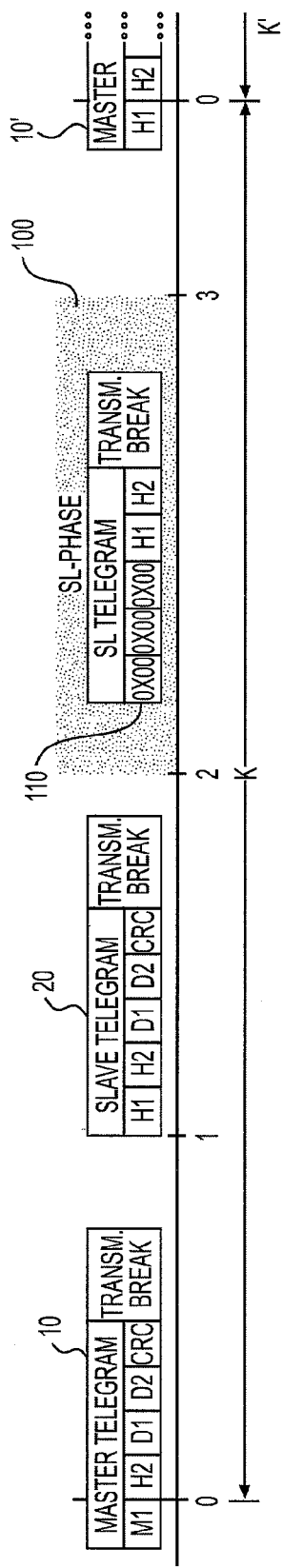

| | | | |
|---|---|---|---|
| 2009/0251363 A1* | 10/2009 | Zohar | G01S 3/52 342/357.22 |
| 2010/0131686 A1* | 5/2010 | Korrek | 710/105 |
| 2011/0063075 A1* | 3/2011 | Hormann | 340/5.7 |
| 2011/0238876 A1* | 9/2011 | Weddingfeld et al. | 710/110 |
| 2012/0278656 A1* | 11/2012 | Berkhahn et al. | 714/37 |

FOREIGN PATENT DOCUMENTS

| | | |
|---|---|---|
| DE | 10 2008 058 401 | 4/2010 |
| EP | 1 771 027 | 4/2007 |

* cited by examiner

CONTROL METHOD FOR A DOOR DRIVE AND DOOR DRIVE

The invention relates to a method for controlling a door drive having a plurality of components which are communicatively connected to one another via a digital bus system, wherein at least one component is a safety component which reports the occurrence of a safety-relevant event over the data bus.

Such a system comprises, for example, a drive control which is connected to a plurality of safety components, for example to a closing edge safety device, via the bus system. The object of the closing edge safety device is to recognize possible danger situations and to report them over the bus system to the central control as a safety-relevant event which makes a suitable response necessary.

An embodiment of such a system is known from DE 20 2005 021 457 U1. The data to be transferred, via which the safety component reports a safety-relevant event, are in this respect packed into a telegram and transmitted over the data bus. Since the communication on the data bus is controlled by a master component, the transmission only takes place, however, when the master component next addresses the safety component. How fast a telegram is transmitted therefore depends both on the transmission rate and on the number of bus subscribers.

Safety-relevant components such as the closing edge safety device or closed circuits should, however, communicate a safety-relevant event as fast as possible and without any time delay to be able to respond with a fast reaction to existing danger situations where necessary.

In DE 10 2008 058 401 B3, the aforesaid problem has already been recognized and a solution approach shown. The technical teaching of this document proposes reporting a safety-relevant event not by data transmission by means of a data telegram, but rather the reporting safety component instead interrupts all data communication on the digital data bus for a specific time period. The blocking of the bus communication effects an absence of all data communication between the components, from which they deduce the report of a safety-relevant event. It is, however, disadvantageous in the solution shown that any data communication over the data bus is consistently prevented for a specific time frame after the occurrence of an event. A safety-relevant event can admittedly be recognized without any time delay; however, the question of the triggering safety component can only be answered after the cancellation of the bus blockage since a corresponding interrogation of the components is required for this purpose.

It is therefore the object of the present invention to provide a method of controlling a door drive as well as a control system for a door drive which knows how to overcome the aforesaid problem.

This object is achieved by a method of controlling a door drive in accordance with the features of the independent claim 1. Advantageous embodiments of the invention are the subject of the dependent subordinate claims.

The present invention therefore relates to a method for controlling a door drive having a plurality of components which are communicatively connected to one another via a digital bus system. In this respect, at least one safety component such as a closing edge safety device, closed circuits or a light barrier is provided which detects safety-relevant events in its area of responsibility and reports the occurrence of a safety-relevant event over the data bus.

In this respect, e.g. one of the bus systems available on the market, RS 485, Profibus, Ethernet, etc., can be used as the digital data bus.

In accordance with the invention, a cyclic safety phase is reserved by the bus protocol for reporting a safety-relevant event. The safety phase establishes a time interval with a specific length which is repeated at fixed points in time. It is essential for the invention that all the components involved acquire knowledge of the respective start time or end time of the safety phase and/or of its interval duration. The method in accordance with the invention makes a uniform synchronization of the components necessary.

In the normal case, no component transmits data over the bus system during the safety phase. If, however, a safety-relevant event is detected by one of the safety components, the latter starts a data transmission during the safety phase without a prior prompt by the master component or any other bus component. This modified state of the bus system can be recognized without a problem by at least one component of the door drive. Accordingly, any type of data transmission during the safety phase has the result that at least one receiving components interprets it as a report of a safety-relevant event. The specific manner of the data transmission which has occurred during the safety phase or its data content is not significant for the basic idea of the invention; the receiving component only has to be able to recognize a difference from the normal case. Only the fact that a data transmission takes place during the safety phase is therefore of importance for the carrying out of the method, whereby a state of the door drive not corresponding to the normal case can be recognized.

A report of a safety-relevant event is preferably recognized as soon as at least one character is received within the safety phase. The possibility of initiating a transmission over the bus system is generally present for every safety component during the safety phase.

A particular advantage of the invention is now that a data transmission does not impair the regular bus communication during the safety phase. The communication of the individual components over the bus system can therefore also be maintained after the occurrence of a safety-relevant event and its report. A blockage of the bus system and a necessary reestablishing of the bus communication are therefore not required.

In a particularly advantageous embodiment of the invention, the digital bus system used is designed as a serial master-slave bus system. The communication of the bus master and of the slave components always takes place within a defined communication window which is preferably defined by a constant window length. The data to be transmitted are packed into individual telegrams which can be transmitted at specific times within the communication window between the master and the slave. A master telegram exists, for example, with which the bus master addresses a specific slave component of the door drive which in turn transmits a response to the bus master by a slave telegram. Only one single slave component is always addressed at any time by the master component during a communication window. Provision is now made in the advantageous embodiment of the invention that at least one safety phase which is available for the report of a safety-relevant event is reserved in each communication window.

The defined communication window preferably starts and ends with the stop bit of the first transmitted or received byte of the master telegram. All the components connected to the data bus synchronize their bus timing to this time.

Only one single slave component is admittedly addressed during one communication window; however, the report of a safety-relevant event during the safety phase of the communication window can be initiated by any desired safety component. There is consequently the possibility that a plurality of modules initiate a data transmission during the safety phase. It is expedient against this background that every component checks whether a data transmission over the bus is already pending during the safety phase before the transmission during the safety phase. If an already pending data transmission is recognized, the safety component can discard and/or interrupt its own transmission procedure and/or postpone it to a later time.

In principle, a non-defined data transmission during the safety phase is sufficient for the realization of the method in accordance with the invention; nevertheless, the use of a safety telegram for reporting at least one safety-relevant event by at least one safety component can prove to be expedient. The safety telegram used preferably includes sender information, whereby the reporting component can be clearly identified. Each component within the bus system receiving the safety telegram can hereby determine without any time delay which safety component has detected and reported a safety-relevant event. The address information includes, for example, information on the unit type of the reporting safety component. The safety telegram can furthermore preferably include any desired information with respect to the event which has occurred to be able to communicate specific data on the time of the event, the type of the event or its priority or relevance to the other components, in particular to the central door control.

At least one component, in particular the bus master, can determine the sender of the report of a safety relevant event by evaluation of the safety telegram. For example, the door control can define a suitable response of the door drive on the basis of the sender information and possibly other information of the safety telegram.

Under certain circumstances, it is not absolutely necessary to deactivate the door drive immediately on an occurrence of specific safety-relevant events. In this case, a suitable regulation of the door drive can take place; for example, the reversal of the drive direction or the restricting of the drive speed, output of a warning message, etc.

The safety telegram advantageously includes a telegram header, also simply called a header, which carries the sender information described above. The structure of the header is preferably substantially the same as the structure of the other bus telegrams, in particular the structure of the master telegram or bus telegram. Furthermore, the safety telegram can have a leading preamble which simplifies the recognition of a safety telegram by the received components. A certain number of bytes of the preamble preferably has the hex value 0x00. The bus level on the sending of a safety telegram is hereby pulled to zero at the start during the safety phase so that a direct recognition of a safety telegram by the received components is ensured.

To check the bus assignment, the safety component must consequently only check the applied bus level before the transmission of a safety telegram or examine its own reception memory for bytes already received during the safety phase.

The transmission process of a safety component transmitting during the safety phase is advantageously repeated for so long until the safety component is addressed by the bus master. The safety component advantageously repeats the data transmission during each cyclically recurring safety phase until it is addressed directly via a master telegram addressed to it.

The invention further relates to a control system for a door drive having a plurality of components which are communicatively connected to one another over a digital bus system, wherein the control system is suitable for carrying out the method in accordance with one of the advantageous embodiments described above. The control system in accordance with the invention accordingly obviously has the same advantages and properties as the method in accordance with the invention, so that a repeat description will be dispensed with at this point. The control system in particular has means for implementing the bus protocol in accordance with the invention.

The invention furthermore relates to a door drive having an integrated control system in accordance with the invention.

The present invention will be explained in more detail with reference to drawings in the following. There are shown:

FIG. 1: a time diagram representation of a communication window; and

Figure 2:
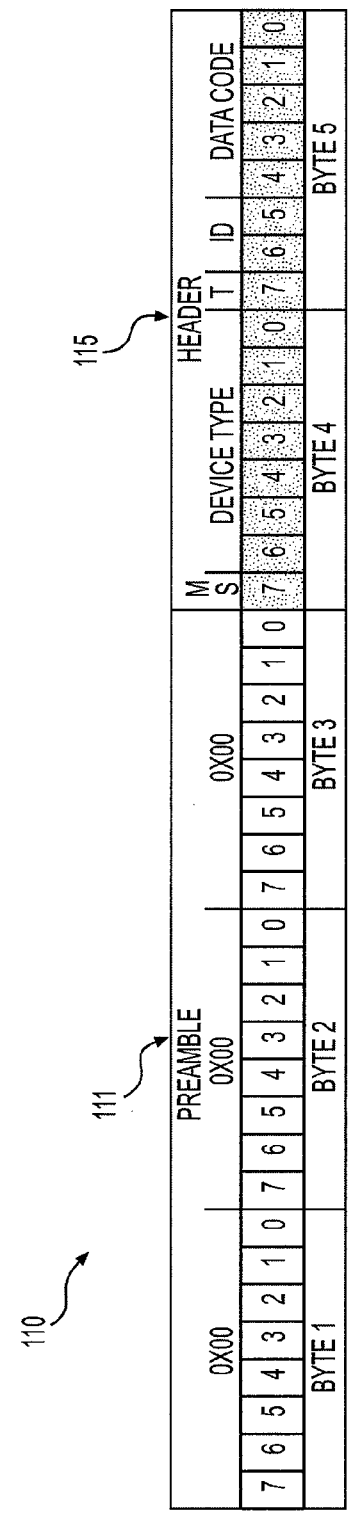

FIG. 2: the basic structure of a safety telegram.

FIG. 1 is intended to illustrate the manner of operation of an embodiment of the control system in accordance with the invention, wherein an embodiment of the method in accordance with the invention for controlling a door drive is implemented. In the embodiment of the control system, it is a door drive having a plurality of components and a digital data bus over which the components communicate with one another, wherein at least one safety component such as a closing edge safety device or a light barrier is provided which reports the occurrence of a safety-relevant event to the other components over the data bus.

In this respect, a central master component is provided for controlling the communication over the data bus. It addresses the individual slave components individually and successively in each case, for which purpose fixed communication windows K, K' are provided. At least one slave component is in this respect a safety component, with the other slave components and/or the master component also being able to be safety components. The central control component of the door drive preferably takes over the function of the bus master.

FIG. 1 shows a time diagram which represents the communication over the data bus within a communication window K. In the first step, the master component with the master telegram 10 is directed to a first specific slave component which is directly addressed with the aid of the header information of the master telegram 10. Within the window K' subsequent to the window K, the master component addresses a further slave component of the door drive system by means of the master telegram 10'. The master component successively interrogates all the individual slave components, with the cycle repeating continuously so that a constant exchange of data is ensured between the master and slave components.

The respective addressed slave component responds with the slave telegram 20 and provides the polled data or information to the master component as a data packet within the telegram 20.

In accordance with the invention, the safety phase 100 which takes up a specific time section within the communication window K, K' is reserved within a communication window, K, K'. In the example of FIG. 1 shown, the safety phase extends from the time 2 up to the time 3 of the window K, with the safety phase 100 adjoining the transmission of the master telegram 10 and of the slave telegram 20. The safety phase can, however, generally be incorporated at any desired point within the communication window K, K'.

Each communication window K, K' starts and ends with the stop bit of the first transmitted or received byte of the master telegram 10. All the components of the door drive synchronize their bus timing to this precise time. All the communication windows K, K' always have a constant length.

The presented implementation of the bus communication allows a fast reporting of a safety-relevant event which takes place independently of the telegram communication. If a safety component, for example a light barrier, detects a safety-relevant event, the safety component starts with the transmission of a safety telegram 110 during the safety phase 100. The transmission of the safety telegram 110 should not or may not exceed the defined time limits of the safety phase 100. For this purpose, the time duration of the safety phase 100 is dimensioned such that the complete transmission of a safety telegram 110 is possible without problem.

Before the start of the transmission of the safety telegram 110, the safety component checks whether a data transmission is already pending in the present safety phase 100. In this case, the transmission of a safety telegram 110 is discarded by the safety component or is alternatively postponed to a later time.

Generally, no data transmission takes place during the safety phase 100 during the regular operation of the door drive. Consequently, it is sufficient for the reliable recognition of a safety-relevant event if at least one character is transmitted within the safety phase 100 by any desired component and is received by any desired component of the bus system, in particular by the bus master. The complete and error-free reception of the sent safety telegram 110 is accordingly not an absolute requirement for the reliable recognition of the report of a safety-relevant event.

The control of the door drive preferably always responds with an immediate stop of the door drive if an undefined data transmission is recognized during the safety phase 100. The bus master subsequently determines the sender of the safety telegram 100 to be received. The further behavior of the door drive can then be deduced while taking the acquired information into account.

It is furthermore expedient that the transmission of a safety telegram 110 is continued for so long until the master component has explicitly addressed the transmitting slave component or the safety-relevant state is no longer present.

FIG. 2 shows the structure of the safety telegram 110 used. The structure comprises a preceding preamble 111 with a length of three bytes, with each individual byte, byte 1, byte 2, byte 3, including the hex value "0x00". The bus level is consequently briefly drawn to zero by the transmission of a safety telegram 110 so that the monitoring of the bus assignment for the remaining components is greatly simplified. The non-transmitting components can recognize the start of a transmission of a safety telegram 110 extremely fast and almost, free of error.

After the preamble 111, the telegram header 115 follows which includes the two bytes, byte 4, byte 5. Byte 4 serves the transmission of information which can be associated with a specific device type and thus clearly identifies the sender of the safety telegram 110. Furthermore, a data code and an ID can be transmitted in byte 5.

The structure of the header 115 substantially corresponds to the header structure in the master and slave telegrams 10, 20. However, in contrast to the master and slave telegrams 10, 20, a CRC test process can be omitted within the safety telegram 110 since only the reception of arbitrary characters within the safety phase 100 is relevant for the recognition of a safety-relevant event and the exact telegram content only plays a subordinate role. A CRC test process is therefore considered superfluous at this point.

The invention claimed is:

1. A method for controlling a door drive comprising:
utilizing a door drive control system comprising a plurality of components, communicatively connected to one another over a digital bus system, the bus system having a bus master and a bus protocol, wherein at least one component of the plurality of components is a safety component, the bus master controls communication over the data bus system, and at least one component of the plurality of the plurality of components is a receiving component;
reserving, via the bus protocol a cyclic safety phase for reporting a safety relevant event;
detecting the safety relevant event with the at least one safety component;
the safety component commencing a data transmission during the safety phase without a prior prompt by any other bus component of the plurality of components;
the at least one receiving component receiving the data transmission; and
the at least one receiving component recognizing any data transmission over the bus system during the safety phase as a report of the safety relevant event;
the bus master being adapted to evaluate the safety-relevant event, and to determine whether to deactivate the door drive;
wherein the at least one safety component transmits a safety telegram during the safety phase, comprising sender information, the sender information comprising information with respect to a device type of the transmitting safety component, after occurrence of the safety-relevant event.

2. A method for controlling a door drive comprising:
utilizing a door drive control system comprising a plurality of components, communicatively connected to one another over a digital bus system, the bus system having a bus master and a bus protocol, wherein at least one component of the plurality of components is a safety component, the bus master controls communication over the data bus system, and at least one component of the plurality of components is a receiving component;
reserving, via the bus protocol a cyclic safety phase for reporting a safety-relevant event;
detecting the safety relevant event with the at least one safety component;
the at least one safety component commencing a data transmission during the safety phase without a prior prompt by any other bus component of the plurality of components;
the at least one receiving component receiving the data transmission; and
the at least one receiving component recognizing any data transmission over the bus system during the safety phase as a report of the safety relevant event;
the bus master being adapted to evaluate the safety relevant event, and to determine whether to deactivate the door drive;
wherein the bus master is further adapted to deactivate the door drive control system immediately following evaluation of the safety relevant event;

wherein the safety component is further adapted to repeat the data transmission related to the safety-relevant event during the safety phase until the safety component is addressed by the bus master: and wherein the bus master is further adapted to immediately deactivate the door drive control system if an undefined data transmission is received during the safety phase.

3. A method for controlling a door drive comprising:

utilizing a door drive control system comprising a plurality of components, communicatively connected to one another over a digital bus system, the bus system having a bus protocol, wherein at least one component of the plurality of components is a safety component, and at least one component of the plurality of components is a receiving component;

reserving, via the bus protocol a cyclic safety phase for reporting a safety-relevant event;

detecting the safety relevant event with the at least one safety component;

the safety component commencing a data transmission during the safety phase without a prior prompt by any other bus component of the plurality of components;

the at least one receiving component receiving the data transmission, and the at least one receiving component recognizing any data transmission over the bus system during the safety phase as a report of the safety-relevant event; and wherein the at least one safety component transmits a safety telegram during the safety phase, comprising sender information, the sender information comprising information with respect to a device type of the transmitting safety component, after occurrence of the safety-relevant event.

4. A method in accordance with claim 3, wherein the safety telegram starts with a preamble, the preamble starting with a specific number of bytes having a value 0x00.

5. A method in accordance with claim 3, wherein at least one component of the plurality of components determines the sender of the transmitted data during the safety phase after the recognition of the report of the safety-relevant event, by evaluation of the safety telegram, with a suitable response of the door drive being defined on the basis of the sender information.

* * * * *